Figure 2A:
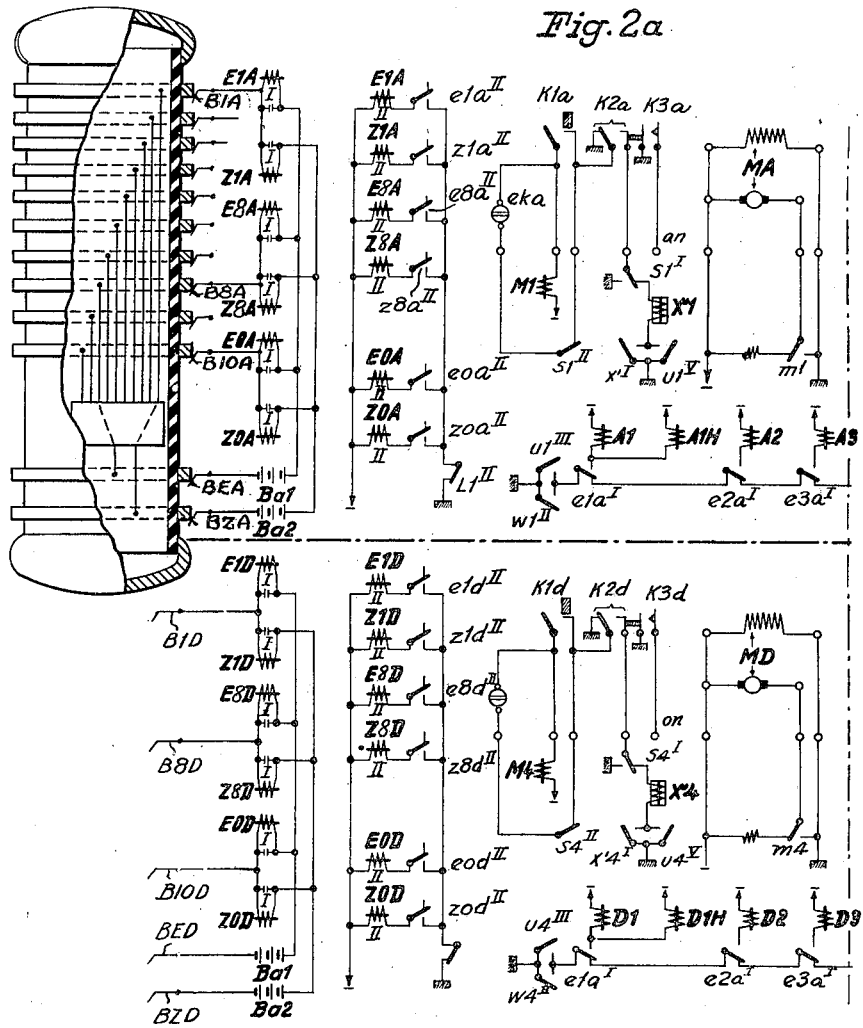

May 13, 1941. K. MEHLIS ET AL 2,241,917
TUBULAR CONVEYER SYSTEM
Filed Feb. 14, 1939 5 Sheets-Sheet 1
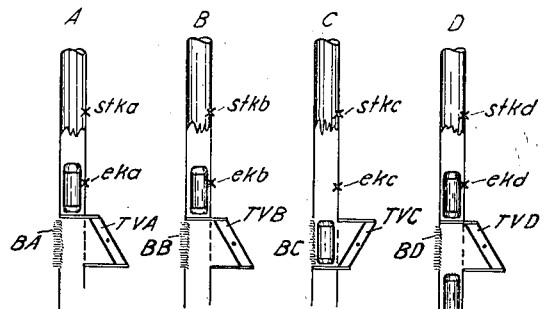
Fig. 1
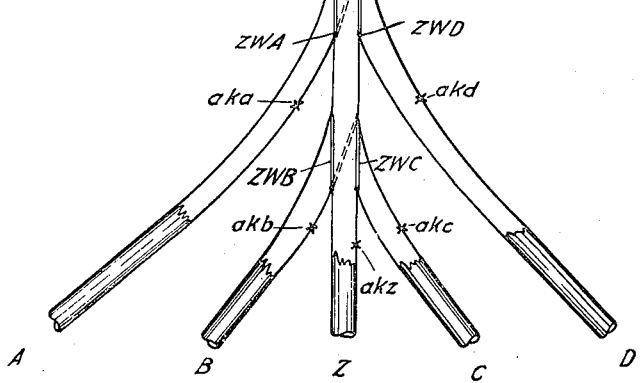
Inventors:
Kurt Mehlis
Walter Mühlberg
by [signature] Att'y.

May 13, 1941. K. MEHLIS ET AL 2,241,917
TUBULAR CONVEYER SYSTEM
Filed Feb. 14, 1939 5 Sheets-Sheet 3

Inventors:
Kurt Mehlis
Walter Mühlberg
by [signature] Att'y.

May 13, 1941.　　　K. MEHLIS ET AL　　　2,241,917
TUBULAR CONVEYER SYSTEM
Filed Feb. 14, 1939　　　5 Sheets-Sheet 4

Inventors:
Kurt Mehlis
Walter Mühlberg
by
Atty.

Patented May 13, 1941

2,241,917

UNITED STATES PATENT OFFICE 2,241,917

TUBULAR CONVEYER SYSTEM

Kurt Mehlis and Walter Mühlberg, Berlin, Germany, assignors to Mix & Genest Aktiengesellschaft, Berlin-Schoneberg, (Germany), a company Application February 14, 1939, Serial No. 256,330
In Germany February 14, 1938

15 Claims. (Cl. 243—16)

The present invention relates to pneumatic tube conveyer systems, and more particularly to exchange systems thereof for delivering conveying containers, such as carriers, moving therealong to the desired tube of a group of outgoing tubes and to cause the appropriate carrier or carriers to be ejected in a predetermined receiving station associated with said tube or tubes.

In one specific aspect, the invention relates to such tubular conveyer systems in which an exchange station comprises a group of incoming tubes and a group of outgoing tubes each of which has a plurality of receiving stations associated therewith. The conveying containers or carriers employed in this system are preferably of the type which is led from one tube into another and to the predetermined receiving station of the tube by own action, in other words, the conveying containers themselves carry their destination characterization. For example, the carriers may be provided with contact rings which are adapted to close electric circuits in which means are rendered effective to bring the carrier into the desired tube for ejection at the proper receiving station at this tube. The system under consideration employs two electric storage equipments, or groups of storage equipments, comprising tens register means and units register means and these equipments are selectively controlled independently of one another in response to the carriers themselves on account of the destination characterization imparted thereto prior to their dispatch, so as to automatically select a given tube and a predetermined receiving station at this tube.

Our invention has for its main object to simplify the possibilities for accommodating the system to special requirements concerning the structural assembly thereof.

This and other problems are solved according to the present invention by so interconnecting the tube switch tongue controlling means of the exchange system and the switch tongue controlling means of the individual receiving stations with said two electric storage equipments that the setting of the first storage equipment in response to the destination characterization of a carrier is decisive at a certain or at all receiving stations not only for the selection of the proper tube but also for the choice of the receiving station, or alternately, that such setting of the second of said storage equipments becomes decisive not only for the selection of the desired receiving station but also for the choice of the appropriate tube.

The above described novel arrangement makes it possible to furnish each and every station of the system with an adequate characterization number independently of the fixed position of the station or stations relative to the appertaining conveying tube. This involves the advantage that each station of the tubular dispatch system may in a simple manner be provided with a characterization number which exactly corresponds to its calling number in the private telephone exchange system of an office, a factory or the like. Such accommodation may easily be effected by means of a simple device, such as a terminal panel located between the storage equipments and the switch tongue controlling means. Such panel may, by way of example, comprise two rows of contacts or terminals so that the desired terminal or terminals of one row may be arbitrarily wired with the appropriate terminal or terminals of the other row in accordance with any desired scheme.

The invention will be more readily understood from the following description of one specific embodiment taken in conjunction with the accompanying drawings, in which:

Fig. 1 schematically shows an exchange station of a tubular conveyer system according to the invention, while the Figs. 2a, 2b, 3a and 3b diagrammatically show the circuit arrangement for carrying out our invention. The last mentioned figures are to be placed horizontally in the above mentioned succession.

In one specific aspect of our present invention, the exchange system diagrammatically shown in Fig. 1 comprises a group of incoming tubes A, B, C and D, and a group of outgoing tubes which latter group is likewise formed by four individual tubes, although any desired number may be employed without departing from the scope of this invention. The incoming and the outgoing tube A may, for instance, in a broad sense form a closed loop having a plurality of stations associated therewith, and this also relates to the other tubes B, C, and D. The groups of incoming tubes and outgoing tubes are interconnected by a single tube common to both groups. Each of the incoming tubes is provided with a carrier separating device TVA, TVB, TVC and TVD, respectively, in a position above the point of interconnection and each of said devices is individually controlled by an electromotor allotted thereto. The separating devices TVA, TVB and TVD are shown in Fig. 1 in their normal positions of rest. Carriers arriving through these tubes are thus stopped by the upper latch member of the separating device projecting into the tube. An incoming carrier which has reached this position automatically operates the appertaining inlet contact, all of which are designated with the prefix *ek* followed by the reference of the tube concerned, that is, *a, b, c* and *d*. The operation of an inlet contact causes the motor to start in a manner hereinafter more precisely described so that the upper latch is withdrawn toward the right out of the tube, while the lower latch is moved toward the left into the tube, whereupon the separating device is in a position as shown at TVC of Fig. 1. The carrier thus enters the separating device where it becomes tested with respect to its destination characterization by the sets of feeler brushes BA to BD allotted to the individual separating devices. Each set of feeler brushes comprises ten individual brushes, e. g. the brushes B1A to B10A and two brushes BEA and BZA which act as return brushes for the units and tens digits, respectively, of the carrier destination characterization. These brushes are partially shown in the upper left portion of Fig. 2a. After a finished test with respect to the destination characterization of the carrier concerned, the motor is again started so as to withdraw the lower latch from and to restore the upper latch into the tube. The carrier leaves the tube due to its own weight and enters the common tube for further conveyance to the desired of the outgoing tubes, whereupon the carrier separating device is again in a normal position of rest and thus prepared to receive further incoming carriers.

In response to the aforementioned testing action, a given relay of the tens register means and a given relay of the units register means are caused to operate and to remain operated in holding circuits established through their respective second windings. Such tens register means and units register means together with the appertaining circuit arrangement are allotted to each incoming tube. This combined arrangement is shown in the Figs. 2a, 2b, 3a and 3b in which for the sake of simplicity only the means provided for the incoming tubes A and D are embodied. In a preferred embodiment of the invention, a terminal panel RV shown at the left side of Fig. 3a is interposed between the register relays and their cooperating auxiliary relays on the one hand, and the switch tongue control relays WA to WD for selecting the proper outgoing tube in the exchange station and the switch tongue control relay groups on the other hand. Also the relay groups allotted to the incoming tubes B and C of Fig. 1 have been omitted for the sake of simplicity so that of the relay groups which act for selecting the desired receiving station in which a moving carrier is to be ejected only two groups (RA1 . . . RA5 and RD1 . . . RD6) are shown in the Figs. 3a and 3b. The operation of any relay forming part of the aforementioned tube switch control relay groups causes the reversal of the corresponding switch tongue ZWA, ZWB, ZWC and ZWD in the exchange station shown in Fig. 1 so as to convey the carrier or carriers to the desired of the four outgoing tubes. In case that none of these switch tongues has been operated, a carrier entering the tube portion common to all tubes will be ejected in the exchange station through the tube Z.

The sequence of switching operations will hereinafter be more closely described in connection with one example of conveyance in which it is assumed that a carrier arriving in the exchange station shown in Fig. 1 through the incoming tube A shall be conveyed to a predetermined receiving station of the tubular conveyer system. This carrier is at first stopped at the top of the carrier separating device in a manner heretofore described. It will also be assumed that this carrier is destinated to the third station associated with the fourth outgoing tube D. It will be easily seen from the Fig. 3a that the switch tongue control relay RD3 of the above identified destination is connected with the terminal D3 of the terminal panel RV and that this terminal is wired by convenience with the terminal 18 on the other side of said panel. Consequently, the desired station has the characterization number 18 so that the contact rings of the carrier under consideration must have accordingly been set to this number.

The carrier thus arriving through the tube A of Fig. 1 operates when stopped by the upper closed latch of the separating device TVA the contact *eka* which on closing establishes an energization circuit for the relay M1 which controls the motor of the separating device TVA. This circuit is traced in Fig. 2a from: earth, via contact K2a in the position shown, closed contact s1 II, closed contact *eka*, winding of relay M1 to grounded battery.

Relay M1 energized closes the following energizing circuit for the motor MA: earth, via contact m1 in its right hand position, armature of motor MA, to grounded battery.

Since the field of this motor is constantly energized as shown the motor is started and shifts the carrier separating device TVA thereby permitting the carrier to fall down into this device for test with respect to its destination marking. One particular relay of the tens register means (Z1A . . . Z8A . . . Z0A) and one particular relay of the units register means (E1A . . . E8A . . . E0A) become energized. Since it was assumed that the carrier considered was given the destination characterization 18, the first relay Z1A of the tens register means is energized from: battery Ba2 via winding I of relay Z1A, feeler brush B1A, contact rings of the carrier in accordance with their setting to the tens digit 1, feeler brush BZA to battery.

Simultaneously the eighth relay (i. e. relay E8A) of the unit register means operates in the following circuit: battery Ba1 via winding I of relay E8A, feeler brush B8A, contact rings of the carrier set to the units digit 8, feeler brush BEA to battery.

These two relays in operating shift their contacts *z1a* I, *z1a* II and *e8a* I, *e8a* II thereby establishing holding circuits for themselves as follows: earth, closed contact *z1a* II, winding II of relay Z1A, to grounded battery; and earth, closed contact *e8a* II, winding II of relay E8A to grounded battery.

The contact *z1a* I when shifter from its normal position (shown in Fig. 2b) prepares a function circuit hereinafter more precisely described. The contact *e8a* I prepares a circuit to which reference is made in the following.

It will readily be understood that the result of the test regarding the destination marking of the carriers arriving through the separate incoming tubes must be transmitted to the carrier diverting switch tongue equipment from the four storage equipments individually allotted to these tubes in any convenient sequence. This is accomplished by the agency of a chain of relays F1, W1, U1, F2, W2, U2 etc. which act as distributor with respect to the sequential transfer of the results of the destination marking test to the tube switch tongue and receiving station switch tongue controlling means. This chain of relays is shown in the lower part of the Figs. 3a and 3b.

Figure 3A:
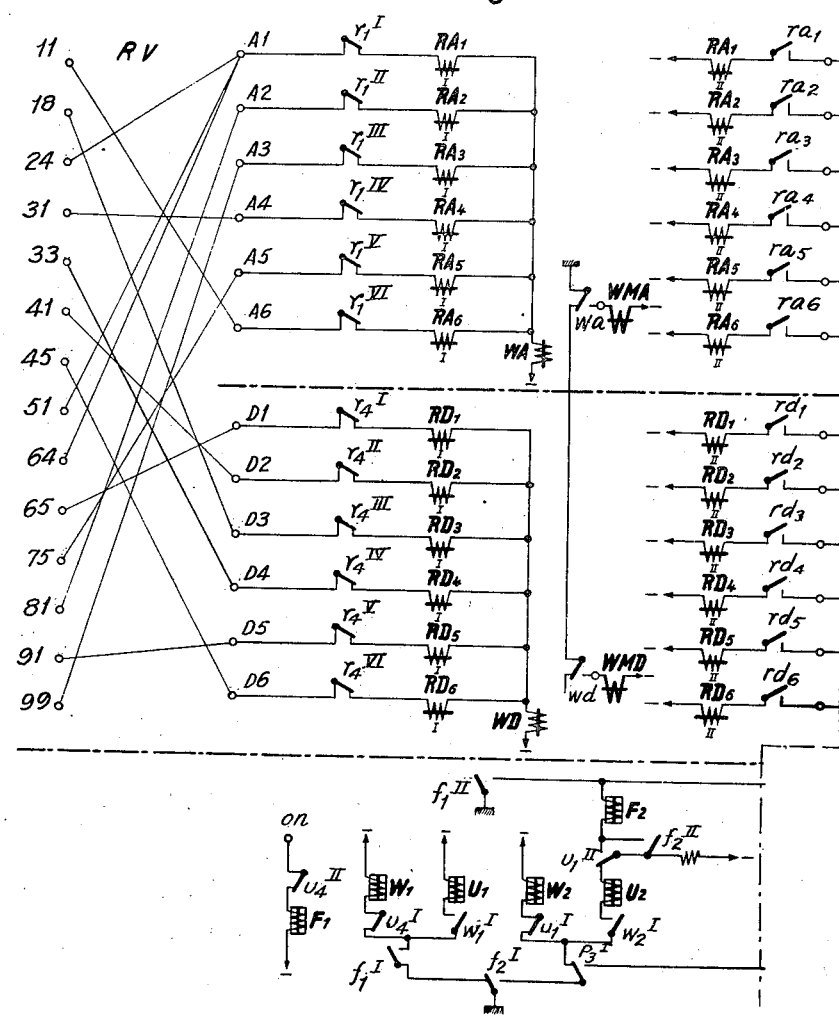

When the separating device TVA has attained the position which is shown at TVC of the incoming tube C in Fig. 1, the contact assembly comprising the contacts K1a, K2a and K3a is mechanically shifted into the right hand position (Fig. 2a) with the result that the operation of the aforementioned distributor relay chain is initiated due to the energization of its first relay F1 in a circuit leading from: earth via contact K3a, terminal an at the top of Fig. 2a, terminal an at the bottom of Fig. 3A (the various terminals an being schematically shown as separate for convenience but all being understood to be connected together), closed contact u4 II, winding of relay F1 to grounded battery of Fig. 3a.

Relay F1 operated causes the energization of the chain relay W1 from: earth via closed contact f2 I in its position shown, closed contacts f1 I and u4 I, winding of relay W1 to grounded battery.

Chain relay W1 energized closes its contacts w1 I and w1 II. The contact w1 II establishes the following circuit for the auxiliary relay A8 via the contact e8a I of Fig. 2b which contact was preparatorily shifted from normal due to the energization of the eighth relay of the units register means as heretofore described: earth, closed contact w1 II, contacts e1a I, e2a I, e3a I, e4a I, e5a I, e6a I, e7a I, in their positions shown, contact e8a I in its upper position, winding of relay A8 to grounded battery.

After a short period of time also the chain relay U1 becomes energized from: earth via contact f2 I in its position shown, closed contacts f1 I, w1 I, winding of relay U1 to grounded battery.

The relay U1 shifts its contacts. At present only the effects due to the break-contact u1 I and to the make contacts u1 II, u1 III and u1 IV will be considered. Since make contact u1 III lies in shunt with contact w1 III which has already been closed, this contact u1 III has no immediate effect. The closure of contact u1 II operates the next distributor chain F2 from: earth, contact f1 II in its right hand position, winding of relay F2, contact u1 II in its upper position, resistor to grounded battery.

The operation of F2 opens the above traced circuits of relays W1 and U1 and prepares an operating circuit for the next distributor chain relay W2 (such circuit being subsequently completed as follows if relay U1 releases): earth, contact f2 I in its right hand position, contact f3 I in its position shown, contact u1 I in its left hand position, winding of relay W2 to grounded battery.

In general if there were no carrier awaiting attention in incoming tube A, both relays W1 and U1 would release at this time responsive to the energization of relay F2 and upon such release of relay U1 the above traced circuit for relay W2 would become effective to cause the operation of this relay W2. The action of the distributor chain would then continue with the operation of relay U2, then the operation of relay F3, then the release of U2 and W2, and then the operation of relay W3, etc. in a manner similar to that above described for relays W1, U1, F2 and W2. Finally the distributor chain would arrive at relay U4 which would then cause the release of F1 and all other distributor chain relays, thus commencing the action of the chain anew unless earlier stopped (by arriving at a U relay corresponding to a waiting carrier) in the manner about to be described.

In the particular case taken for explanation, however, it has been assumed that a waiting carrier is standing in incoming tube A and that three storage relays (Z1A, E8A and A8) which are associated with this incoming tube A have been energized. Under such conditions the closure of contact u1 IV establishes a function circuit traced as follows: earth via contact u1 IV in its left hand position, winding II of relay U1, winding of relay S1, contact v1 III in its position shown, contact z1a I in its right hand position, closed contact a8, terminal 18 of Fig. 2b, terminal 18 of the left side of terminal panel RV, terminal D3 of the right side of terminal panel RV, contact r4 III in its position shown, winding I of relay RD3, winding of relay WD to grounded battery.

The relay WD responds and shifts its contact wd which closes an obvious circuit for the switch tongue magnet WMD from: earth via contact wa in its position shown, contact wd in its right hand position, winding of magnet WMD to grounded battery, so that this magnet operates and shifts the switch tongue ZWD of Fig. 1. Also the relay RD3 was operated in the function circuit so that its contact rd3 is closed. This contact establishes a circuit from: earth via closed contact ak43, winding of magnet WD3, closed contact rd3, winding II of relay RD3 to grounded battery.

The relay RD3 thus holds via its second winding and magnet WD3 responds and operates its pertaining switch tongue in the wanted station. The second winding II of the chain distributor relay U1 was likewise energized in the aforementioned function circuit so that this relay remains operated as long as this circuit persists. The effect of such holding of relay U1 is that when relay F2 operates (as above described in connection with the distributor chain) only relay W1 but not relay U1 releases so that further progress of the chain is stopped, since the relay W2 remains de-energized due to the still open contact u1 I.

Also the relay S1 was energized in the heretofore traced function circuit whereby the motor MA of the carrier separating device was again started by means of its control relay M1 energized in the following circuit: earth via contact s1 I in its left hand position, contacts K2a and K1a of the contact assembly in their right hand positions, winding of relay M1 to grounded battery, Fig. 2a.

The separating device TVA of the incoming tube A of Fig. 1 is operated by motor MA and thus restored to normal as shown in this drawing so that the carrier therein is permitted to proceed into the common tube and then to enter the outgoing tube D due to the present position of the switch tongue ZWD heretofore referred to. Immediately after the passage along this switch tongue, the carrier closes the outlet contact akd shown in Fig. 1 and at the lower right side of Fig. 3b. The relay R4 operates over its winding I in series with its auxiliary relay R4H in the following circuit: earth, closed contact akd, winding I of relay R4, winding I of relay R4H, to grounded battery.

These relays, moreover, lock up so that they will remain operated even after the contact akd again opens in a circuit from: earth via contact

*t4* II in its shown position, contact *r4h* in its left hand position, windings I of the relays R4 and R4H to grounded battery.

Moreover, the contact *r4* III of Fig. 3a interrupts the previously traced function circuit so that the relays WD, S1 and U1 release. Also the switch tongue magnet WMD is de-energized since the contact *wd* is restored to its position shown due to the release of relay WD. Relay RD3 and magnet WD3 which controls the station switch tongue (not shown) remain operated over the following circuit: earth, contact *ak*43 in its position shown, winding of WD3, closed contact RD3, winding of RD3 to grounded battery.

The release of relay U1 prepares the distributor chain to immediately resume its stepping by means of its relays W2, U2 etc. in response to a continued energization of relay F1 by the K3a contact of the separator of some other incoming tube if any other such separator is off normal; since the relay F2 remains energized with its contact *f2* I in its right hand position. If, however no other incoming tube has its separator off normal, relay F1 was de-energized at contact *k3a* of the contact assembly which was mechanically restored to normal by the separating device TVA when reset to its normal position. Also the control relay M1 of the motor MA was caused to release when the contact assembly K1a, K2a and K3a was set to normal position. Due to the release of relay S1, the contacts of this relay have been restored.

The contacts *r4* I to *r4* VI (now open due to the energization of relay R4 through its winding I as mentioned heretofore) maintain the outgoing tube D locked until the carrier under consideration has been ejected at its destination station as determined by the setting of the station switch tongue (not shown) associated with magnet WD3. This tube blocking is due to the fact that the open contacts do not permit any function circuit to be established for any switch tongue of this tube since none of the relays RD1 to RD6 can be energized. Any carrier or carriers which might be waiting in any of the four carrier separating devices for dispatch to the tube D would be preliminarily arrested in such separators. Under such conditions, however, the distributor chain would continue its stepping action as long as any separators were off normal in order to establish a function circuit for conveying a possible further waiting carrier to a free outgoing tube and to the desired station associated therewith. At the end of the fourth step the chain would again start a new operating cycle as previously mentioned so as to make a renewed succession of test steps.

When the carrier under consideration becomes ejected at the station having the characterization number 18, the outlet contact *ak*43 thereof is momentarily operated so that the relay RD3 and the switch tongue magnet WD3 release. The contact *ak*43 operated also establishes a circuit for operating relay T4 as follows: earth, contact *ak*43 in its operated position (contactor vertical), winding I of relay T4, winding II of relay R4, winding II of relay R4H, to grounded battery.

When relay T4 operates, its contact *t4* II opens the circuit of windings I of relays R4 and R4H. Thereafter the return to normal of switch *ak*43 causes relays R4 and R4H to release. The relay T4 is rendered slow-to-release by the aid of its second winding being short-circuited by its contact *t4* I so as to reliably assure the release of these three relays. The blocking of the outgoing tube D is now abandoned since the contracts *r4* I to *r4* VI are restored to normal as shown in Fig. 3a.

During the energization of relay S1 in the aforemenioned function circuit, at first the relay H1 was operated and held via contact *s1* III in its left hand position and then, after the release of relay S1 and during the release time of this slow-to-release relay, H1, the relay L1 was energized at contact *h1* in its left hand position. The holding circuit through the second winding of the tens register relay Z1A and the units register relay E8A which were assumed operated in the example described become interrupted at contact L1 II due to the transient operation of relay L1 thus restoring these register relays shortly after the release of S1.

The last not yet mentioned contact of the relay U1, that is the contact *u1* V which was likewise operated due to the energization of this relay also establishes a circuit for the high ohmic relay X1 from: earth via closed contact *u1* V, winding of relay X1, contact *s1* I in its position shown, contacts K2a and K1a in their right hand position, winding of relay M1 to grounded battery.

In this circuit, however, the relay M1 remains uninfluenced due to the fact that relay X1 is highly resistive. This relay which operated immediately holds via its own contact *x1* I, but becomes de-energized as soon as its circuit is interrupted at contact *x1* I when relay S1 responds in the function circuit heretofore considered.

If the above described transfer of the carrier destination charactrization from the storage equipment to the corresponding tube and station switch tongues would fail in any maner, no function circuit can be established and in consequence thereof the relay S1 cannot operate. The relay X1 therefore, continually remains operated. The circuit established (from earth via its contact *x1* II, the winding of thermo relay H*i*1, contact *v1* I, resistor to grounded battery) therefore remains closed for a sufficient period of time for heating this relay so as to operate its contact for closing an energization circuit for relay V1 through its winding I: earth, contact *x1* II in left position, contact of thermo-relay H*i*1 in left position, winding I of relay V1, to grounded battery. The relay V1 holds from: earth via closed contacts L1 I and *v1*, winding II of relay V1 to grounded battery. The contact *v1* III of this relay now forms an auxiliary function circuit from: earth via closed contact *u1* IV, winding II of relay U1, winding of relay S1, contact *v1* III in its lower position, contact *kx* II in its position shown, winding of relay Z to grounded battery. The relays S1 and Z and also the winding II of relay U1 are thus energized in series. The motor control magnet or relay M1 is now directly energized via contact *s1* I in its left hand position in a circuit heretofore traced. The motor MA starts and restores the separating device to normal so that the carrier falls down into the common tube. Relay X1 releases followed by the thermo relay H*i*1 due to the opened contact *x1* II. Since no switch tongue of the outgoing tubes has been operated, the carrier thus proceeding becomes ejected in the exchange station of Fig. 1 through the outlet tube Z. The relay Z has for its object to determine or ascertain the occurrence of such interferences. A carrier thus caused to be ejected in the exchange station operates the outlet contact akz of Fig. 1 which contact is also shown in the lower right corner of Fig. 2b. This contact closed energizes the windings I and II of the relay KX in series. Relay KX operated opens its contact kx II forming part of the auxiliary function circuit so that the relays UI, SI and Z release.

The heretofore mentioned thermo relay will also operate in connection with troubles of other kind than the heretofore described, occurring in the system, for example, if a carrier is provided with a destination number which does not exist in the system, or if the selected outgoing tube should be permanently blocked due to interferences therein, and so forth. In all such events this relay will be heated for a sufficient period of time for causing its operation.

Figure 2B:
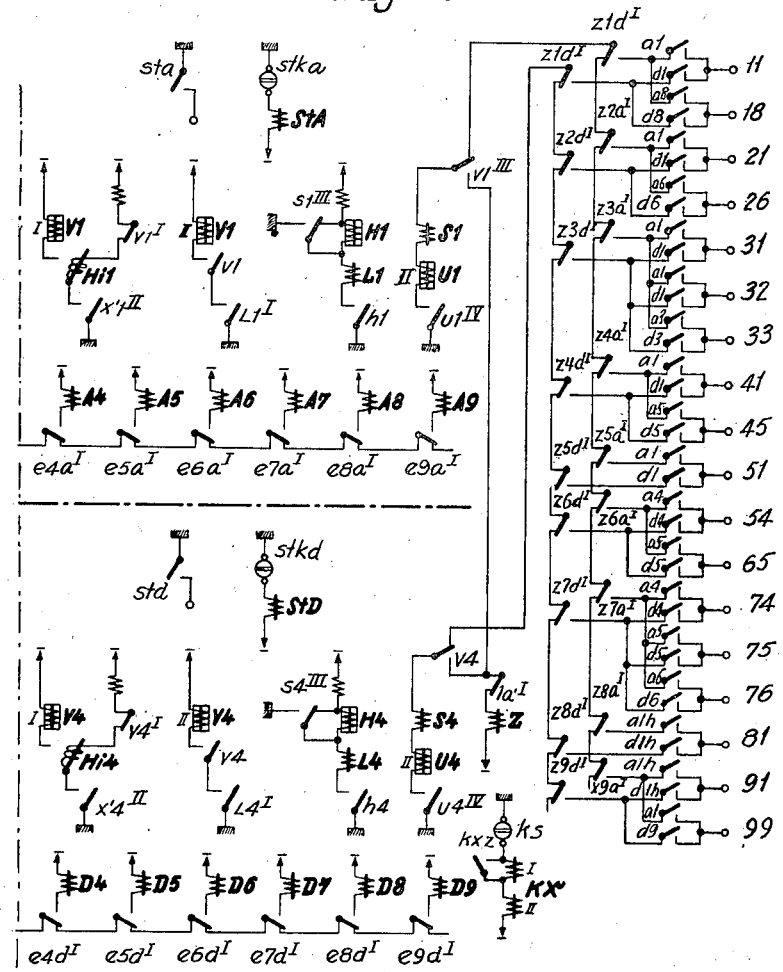

Each incoming tube is provided with a pile contact, that of the incoming tube A being designated stka and also shown at the head of Fig. 2b. This contact is operated when waiting carriers piled up one above the other in the tube reach a predetermined height. The operated contact stka, by way of example, causes the energization of the relay StA in an obvious circuit. The contact sta of this relay may be used to initiate any kind of switching operations in order to indicate such abnormal condition, e. g. by submitting a signal to a service supervisor who by special manipulations will then pay preferred attention to such tube, for instance, by causing the piled up carriers in this tube to be ejected in the exchange station. This may, of course, also be automatically effected in dependence upon the position of the contact sta, by artificially causing the relay VI to operate in response to the operation of relay StA so as to re-establish the function circuit through windings of relays UI II, SI and Z, for example.

Figure 3B:
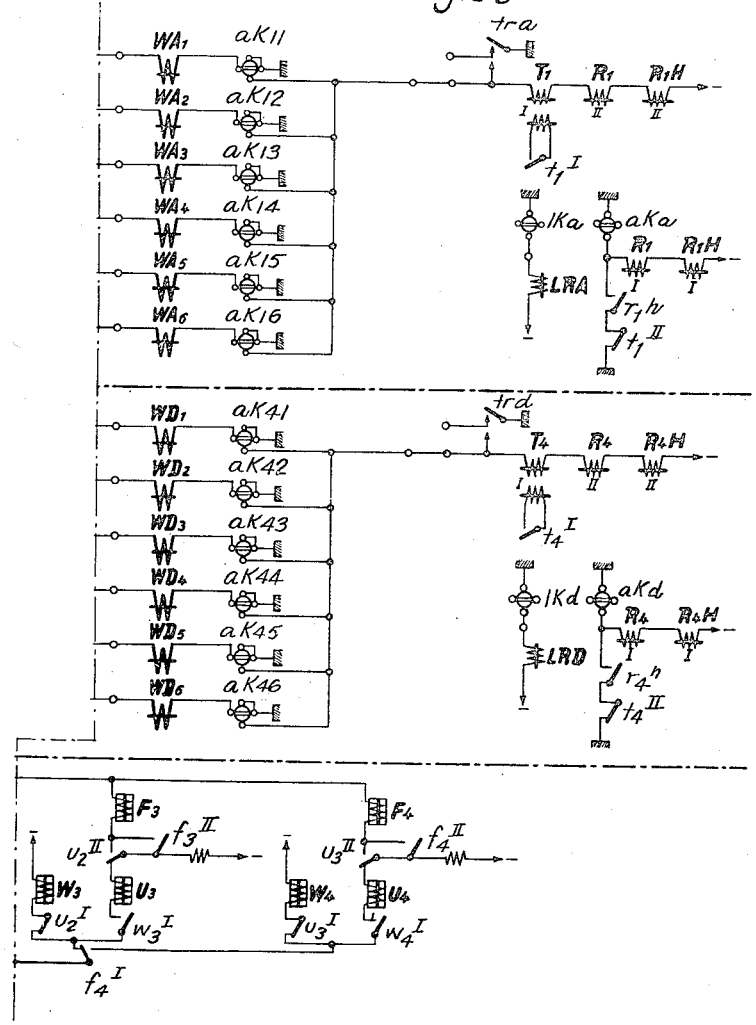

The condition of the contacts lka etc. shown at the right side of Fig. 3b depends upon the air pressure in the appertaining outgoing tube. Preferably, manometer responsive contacts will be used for this purpose. If the carrier driving compressional air would be reduced in pressure or even die out entirely, the manometer contact of the tube concerned becomes closed so that the relay LRA is caused to operate. The contact tra of this relay establishes an operating circuit through the windings I of relay TI, II of relay RI and II of relay RLH which relays become energized so as to block the tube in a manner heretofore described, until the trouble has been removed. It is obvious that the last mentioned arrangement may cooperate with a visual and/or an acoustic alarm signal. On the other hand, the relay LRA and also the corresponding relays of the other tubes may be used for immediately ejecting carriers in the exchange station itself when such carriers wait for transfer into the outgoing tube concerned. Such ejection may then be accomplished in a manner heretofore described.

The terminal panel shown in Fig. 3a has been so wired in the embodiment described that carriers carrying the three destination characterization numbers 26, 51 and 64 will become ejected in the same receiving station, that is, in the first receiving station of the outgoing tube A since the terminals 26, 51 and 64 of the left row of terminals are wired with the same terminal AI forming part of the right row of terminals of this panel. No matter which of these numbers is imparted to a carrier before its dispatch, these carriers will be ejected in the same station. This arrangement involves the possibility to directly identify the carrier for which person at the receiving station the separate carriers are intended to be received. For instance, if the contact rings of one carrier show the characterization number 26, the operator at this station will immediately observe that the member I of the staff at this station is the addressee, while an arriving carrier having destination number 51 is intended for member II of the staff and so forth. This involves the essential advantage that the addressee might be ascertained without opening the carrier so that a certain secrecy with respect to the content of messages forwarded in a tubular conveyer system has been ensured.

What is claimed is:

1. A pneumatic tube conveyer system comprising, an exchange station, a group of tubes incoming to said station, a group of tubes outgoing from said station, a single tube interconnecting the tubes of one group with the tubes of the other group, a plurality of receiving stations associated with each outgoing tube, and means for selectively conveying a carrier from any of said incoming tubes through said single tube to a particular one of said outgoing tubes and to any desired receiving station associated with said particular tube, comprising carrier separating devices individually allocated to each incoming tube for successively feeding incoming carriers into said devices, test means in each of said devices to subject an incoming carrier to a test with respect to its destination characterization number imparted thereto prior to its dispatch, a group of electric storage equipments for each separating device having tens digit registers and units digit registers connected with the appropriate one of said test means and selectively responsive to the result of said test, means in each of said separating devices for successively feeding tested carriers into said single tube, switch tongue control means in each of said outgoing tubes, switch tongue control means at each of said receiving stations, and means for interconnecting said storage equipments with the switch tongue control means in said outgoing tubes and at said receiving stations to render the setting of the said tens registers and the said units registers, respectively, determinant in a number of receiving stations not only for the selection of an outgoing tube but at the same time for the selection of a receiving station, and not only for the selection of a receiving station but also for the selection of an outgoing tube, respectively.

2. A pneumatic tube conveyer system comprising, an exchange station, a group of tubes incoming to said station, a group of tubes outgoing from said station, a single tube interconnecting the tubes of one group with the tubes of the other group, a plurality of receiving stations associated with each outgoing tube, and means for selectively conveying a carrier from any of said incoming tubes through said single tube to a particular one of said outgoing tubes and to any desired receiving station associated with said particular tube, comprising carrier separating devices individually allocated to each incoming tube for successively feeding incoming carriers into said devices, test means in each of said devices to subject an incoming carrier to a test with respect to its destination characterization number imparted thereto prior to its dispatch, a group of electric storage equipments for each separating device having tens digit registers and units digit registers connected with the appropriate one of said test means and selectively responsive to the result of said test, means in each of said separating devices for successively feeding tested carriers into said single tube, switch tongue control means in each of said outgoing tubes, switch tongue control means at each of said receiving stations, and a terminal panel having a first row of terminals individually provided for each desired combination of tens and units digits and adapted to selectively form part of a function circuit preparatorily built up by the tens and the units register responding to said test, and a second row of terminals individually connected through one switch tongue control means of a receiving station to the switch tongue control means of the tube leading to said station, any terminal of said first row being connected to any terminal of said second row to operate the desired switch tongue control means in the desired tube and at the desired station of said tube in response to the completion of said function circuit.

3. A pneumatic tube conveyer system as defined in claim 2, in which the individual terminals of said first row are arbitrarily connectible with any terminal of said second row to render the characterization number of each receiving station independent of the relative position of any receiving station in the tubular conveying system.

4. A pneumatic tube conveyer system as defined in claim 2, in which a plurality of terminals of the said first row are arbitrarily connectible with any one of the terminals of said second row for conveying to any one receiving station carriers having different destination characterization numbers imparted thereto.

5. A pneumatic tube conveyer system comprising, an exchange station, a group of tubes incoming to said station, a group of tubes outgoing from said station, a single tube interconnecting the tubes of one group with the tubes of the other group, a plurality of receiving stations associated with each outgoing tube, and means for selectively conveying a carrier from any of said incoming tubes through said single tube to a particular one of said outgoing tubes and to any desired receiving station associated with said particular tube, comprising carrier separating devices individually allocated to each incoming tube for successively feeding incoming carriers into said devices, test means in each of said devices to subject each incoming carrier to a test with respect to its destination characterization number imparted thereto prior to its dispatch, a group of electric storage equipments for each separating devices having tens digit registers and units digit registers connected with the appropriate one of said test means to selectively store the result of said test, switch tongue control means in each of said outgoing tubes, switch tongue control means at each of said receiving stations, means interconnecting said storage equipments with the switch tongue control means in said outgoing tubes and at said receiving stations, a distributor device common to all storage equipments to secure the stored result of a test to be transmitted in a predetermined succession to the desired of said switch tongue control means, and means in each of said separating devices for successively feeding tested carriers through said single tube to the desired of said outgoing tubes.

6. A pneumatic tube conveyer system as defined in claim 5, in which said distributor device comprises a chain of relays successively operated in response to the action of each carrier separating device to establish a function circuit for the switch tongue control means determinant for the desired tube and the desired receiving station.

7. A pneumatic tube conveyer system comprising, an exchange station, a group of tubes incoming to said station, a group of tubes outgoing from said station, a single tube interconnecting the tubes of one group with the tubes of the other group, a plurality of receiving stations associated with each outgoing tube, and means for selectively conveying a carrier from any of said incoming tubes through said single tube to a particular one of said outgoing tubes and to any desired receiving station associated with said particular tube, comprising carrier separating devices individually allocated to each incoming tube for successively feeding incoming carriers into said devices, test means in each of said devices to subject each incoming carrier to a test with respect to its destination characterization number imparted thereto prior to its dispatch, a group of electric storage equipments for each separating device having tens digit registers and units digit registers connected with the appropriate one of said test means to selectively store the result of said test and to prepare a function circuit for putting said result into effect, switch tongue control and actuating means for each outgoing tube and for each receiving station, an additional supervisory relay arrangement common to all switch tongue actuating means of the receiving stations associated with one outgoing tube, a distributor relay chain common to all said separating devices so as to start its action in response to a carrier entering either of said devices for completing said function circuit to the switch tongue control and actuating means in the desired outgoing tube and at the desired receiving station associated with said tube, and means to automatically stop the action of said distributor relay chain in response to a carrier leaving a separating device.

8. A tubular conveying system as defined in claim 7, in which said additional supervisory relay arrangement is provided to block the action of said distributor relay chain until a carrier entering a free tube has been ejected at the desired station associated with said tube.

9. A tubular conveyer system as defined in claim 7, in which said additional supervisory relay arrangement is provided to cause the action of said distributor relay chain to proceed when the desired outgoing tube is occupied by a carrier moving therethrough.

10. A tubular conveyer system as defined in claim 7, in which a relay forming part of said distributor relay chain is provided with a second winding forming part of said function circuit.

11. A tubular conveyer system as defined in claim 7, in which a relay is included in said function circuit to cause a tested carrier to be delivered from the appertaining separating device into said single tube for further conveyance to the desired outgoing tube and to the proper station at this tube.

12. A tubular conveyer system as defined in claim 7, in which each of said separating devices is controlled by an electromotor.

13. A tubular conveyer system as defined in claim 7, in which a relay system is caused to respond due to troubles in the said conveyer system so as to block the section thereof affected by such trouble.

14. A tubular conveyer system as defined in claim 7, in which each incoming tube of said exchange station is provided with supervisory means responding when a pile of waiting carriers exceeds a given height so as to cause such carriers to be ejected in the exchange station itself.

15. A tubular conveyer system as defined in claim 7, in which air pressure responsive means are provided and caused to respond in cases that compression air troubles occur so as to block the section of said conveyer system in which such troubles are set up.

KURT MEHLIS.
WALTER MÜHLBERG.